United States Patent [19]

Ruggin et al.

[11] Patent Number: 4,936,199
[45] Date of Patent: Jun. 26, 1990

[54] DEVICE FOR LOADING, PRESSING, FEEDING AND DISPOSING OF THE GROUND COFFEE IN AUTOMATIC ESPRESSO COFFEE MACHINES

[75] Inventors: Remo Ruggin, Cerro Maggiore; Mario Allieri, Parabiago, both of Italy

[73] Assignee: Rancilio Macchine Per Caffe' S.p.A., Parabiago, Italy

[21] Appl. No.: 329,382

[22] Filed: Mar. 27, 1989

[30] Foreign Application Priority Data

Apr. 1, 1988 [IT] Italy .............................. 21013/88[U]
Apr. 1, 1988 [IT] Italy .............................. 21014/88[U]

[51] Int. Cl.⁵ ............................................. A47J 31/00
[52] U.S. Cl. ..................................... 99/289 R; 99/287
[58] Field of Search ............. 99/289 R, 289 D, 289 P, 99/279, 287, 297, 289 T; 426/433

[56] References Cited

U.S. PATENT DOCUMENTS 2,907,266 10/1959 Moulden ........................... 99/289 R
3,203,340 8/1965 Totten ................................ 99/289 T
4,709,625 12/1987 Layre ................................. 99/289 R Primary Examiner—Robert W. Jenkins
Attorney, Agent, or Firm—Wenderoth, Lind & Ponack

[57] ABSTRACT

A device for loading, pressing, feeding and disposing off the ground coffee in automatic espresso coffee machines, which comprises crank mechanisms connected to the coffee feeding carriage and the coffee pressing piston, respectively; motors for driving the crank mechanisms; cam means associated with the crank mechanism actuating motors for positioning the coffee feeding carriage in the coffee loading and disposal station and in the coffee infusion station, and for moving the pressing piston in the coffee pressing and disposal position and in the rest position; and control means for controlling the crank mechanism actuating motors.

12 Claims, 4 Drawing Sheets

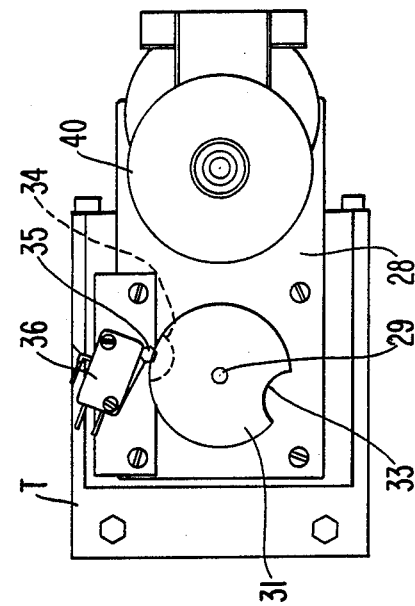
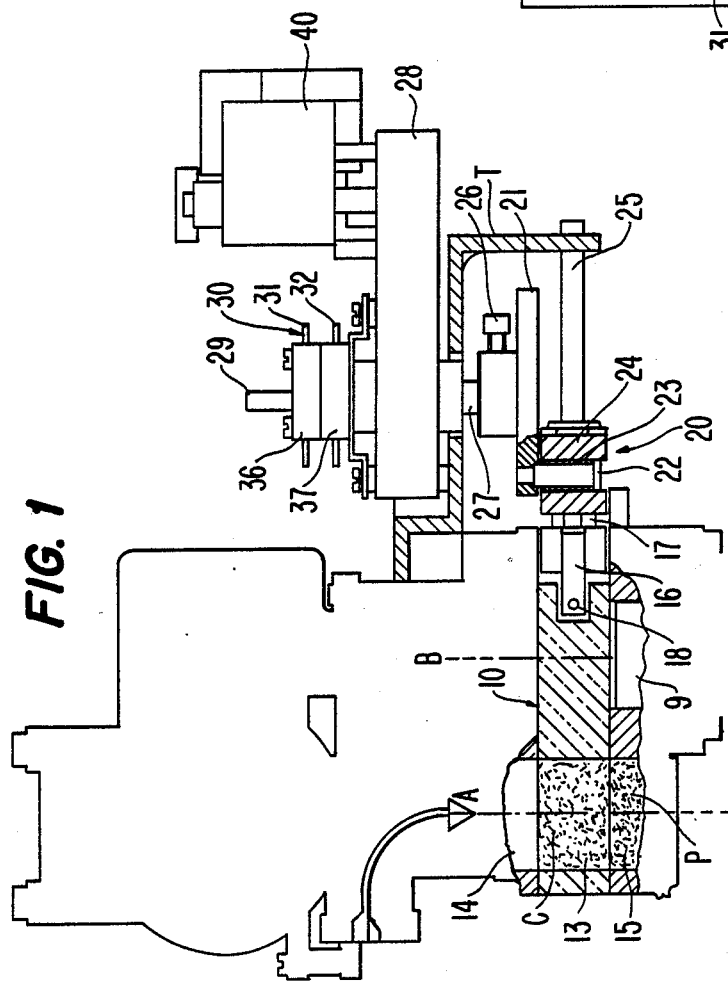

000
DEVICE FOR LOADING, PRESSING, FEEDING AND DISPOSING OF THE GROUND COFFEE IN AUTOMATIC ESPRESSO COFFEE MACHINES

BACKGROUND OF THE INVENTION

1. Field of the Invention

This invention generally relates to automatic espresso coffee machines and, more particularly, to an improved device for loading, pressing, feeding and disposing off the ground coffee in automatic espresso coffee machines.

2. Description of the Prior Art

It is known that in the automatic espresso coffee machines, so called machines of integral type, all the operations for obtaining the espresso coffee are automatically carried out in a sequence.

Such machines comprise normally a coffee mill intended to grind the grains of coffee, a pump for the water, a boiler intended to produce hot water for the infusion of the coffee and a unit intended to prepare the espresso coffee.

This unit carries out all the operations for loading, pressing, feeding the ground coffee, infusing it, delivering the coffee infusion and disposing off the coffee grounds.

Normally, for carrying out these operations, the unit for preparing the espresso coffee contains all the elements for causing the movements for positioning the ground coffee in the various working stations. To this purpose, for feeding the ground coffee to the infusion station, a reciprocating carriage is provided which reciprocates from a coffee loading and disposal station to the coffee infusion station. This carriage is provided with a receptacle for receiving the ground coffee coming from the coffee mill in the loading station, moving it in the infusion station for preparing the coffee infusion and returning the coffee grounds in the loading station for the disposal of them.

In the loading station the ground coffee is to be pressed to the correct degree in order to be then transferred, in this pressed condition, to the coffee infusion station. For pressing, loading and disposing off the ground coffee a pressing piston is used.

The movements of the coffee feeding carriage and the coffee pressing piston are hydraulically or pneumatically controlled by rather complex means which can deteriorate and even be damaged, thereby requiring a frequent servicing and changing thereof. These disadvantages negatively affect both the manufacturing costs of the conventional espresso coffee machines and the life thereof.

SUMMARY OF THE INVENTION

The present invention aims at obviating the above mentioned disadvantages and deficiencies by providing a device for loading, pressing, feeding and disposing off the ground coffee in automatic espresso coffee machines which is of simple design and operation and requires inexpensive components which are nearly or totally free of servicing.

According to the invention, the device for loading, pressing, feeding and disposing off the ground coffee in automatic espresso coffee machines, of the type having a coffee feeding carriage and a coffee pressing piston comprises:

first and second crank mechanisms connected to the coffee feeding carriage and the coffee pressing piston, respectively:

first and second motors for driving the first and second crank mechanisms, respectively;

cam means associated with each of the first and second crank mechanism actuating motors for positioning the coffee feeding carriage in the coffee loading and disposal station and in the coffee infusion station, respectively and for moving the pressing piston in the coffee pressing and disposal station and in the rest station, respectively; and control means for energizing the first and second crank mechanism actuating motors at the end of the coffee loading and disposal operation and the coffee infusion operation of the carriage, respectively and at the end of the coffee pressing and disposal operation and the loading operation, of the pressing piston, respectively.

BRIEF DESCRIPTION OF THE DRAWINGS

FIG. 1 is a side elevation view, partially sectioned along the line I—I of FIG. 3, showing the mechanism for reciprocating the coffee feeding carriage;

FIG. 2 is a plan view of the motor associated to the coffee feeding carriage together with the two disc cam controlling the stop microswitches of the motor;

DESCRIPTION OF THE PREFERRED EMBODIMENT

COFFEE FEEDING MECHANISM

Figure 3:
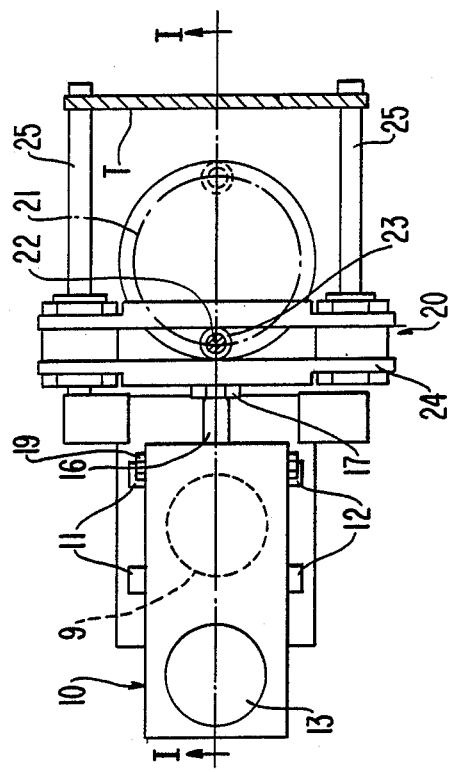
FIG. 3 is a plan view of the carriage crank mechanism and the coffee feeding carriage in the coffee loading-disposal station.

FIGS. 1 to 4 show the mechanism for feeding the ground coffee from the coffee loading station to the coffee infusion station. For this purpose, a coffee feeding carriage, generally designated 10, is used. This carriage slides between two pairs of guides 11 and 12 (FIGS. 3 and 4) from a station A wherein it is in the ground coffee loading and disposal station to a station B wherein it is in the coffee infusion station, above the delivery opening 9. In the carriage 10 a receptacle 13 is provided for receiving the ground coffee coming from the conventional coffee mill (not shown).

In the station A the receptacle 13 of the carriage 10 is located below the cylindrical chamber 14 for receiving the ground coffee and in which the pressing piston of the espresso coffee machine reciprocates. In the station A the receptacle 13 of the carriage 10 is also located above the opening 15 for disposing off the coffee grounds.

Figure 4:
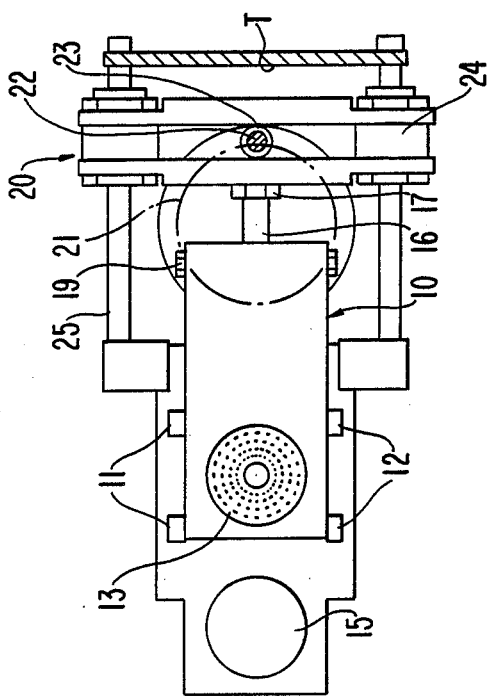
FIG. 4 is a view similar to FIG. 3 showing the coffee feeding carriage in the coffee infusion station.
Figure 6:
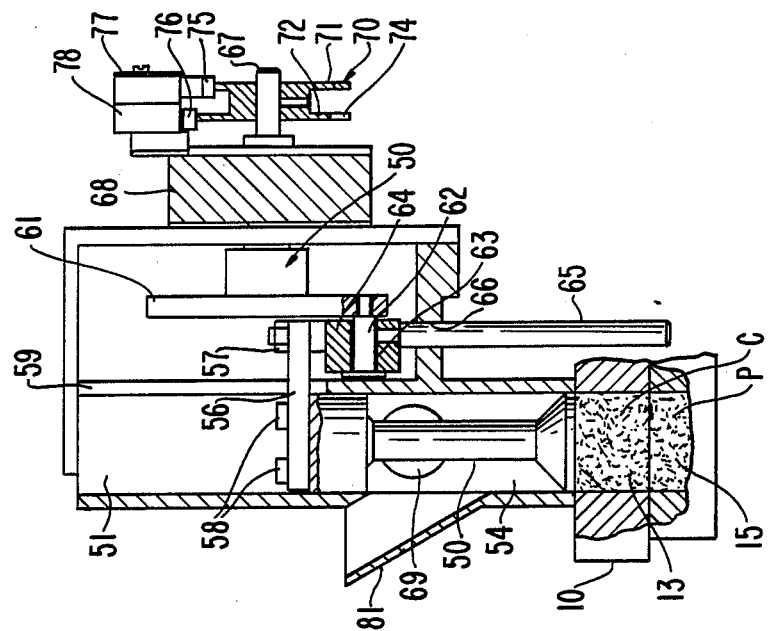
FIG. 6 is a plan view of the motor associated to the coffee pressing piston together with the two disc cam controlling the stop microswitches of the motor.
Figure 5:
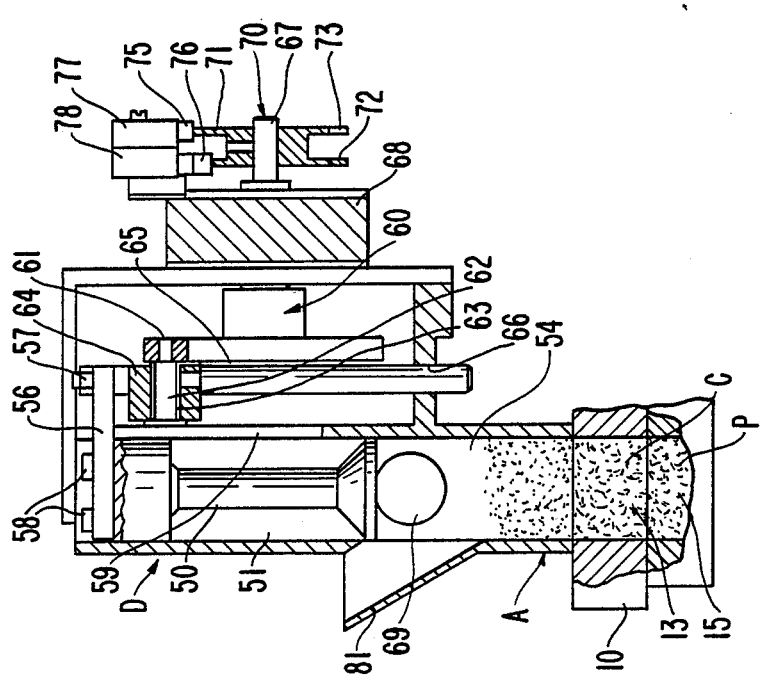
FIG. 5 is a side elevation view showing the mechanism for loading, pressing and disposing off the ground coffee.

The carriage 10 is connected at its rear end to a crank mechanism, generally designated 20, through a rod 16 the free end of which is adjustable by a nut 17 screwed on a threaded portion thereof and pivotally connected to the carriage by means of an anchor pin 18 connected to the carriage by means of nuts 19 (FIGS. 3 and 4).

The crank mechanism 20 comprises a crank wheel 21 having a crank pin 22 on which a bushing 23 freely rotates and a slotted link 24 formed of a pair of plates connected to each other at the ends by bushings. The ends of the slotted link 24 slide on a pair of rods 25 (as can best be seen in FIGS. 3 and 4) which are fastened to the machine frame T.

The crank wheel 21 is fastened by a screw 26 to the lower end 27 of the output shaft of a reducing gear 28 driven by an electric motor 40, whereas to the upper end 29 of the output shaft of the reducing gear 28 a cam means is fastened, generally designated with 30. This cam means comprises two parallel cam discs 31,32 each provided with a notch 33 and 34, respectively and each of the cam discs 31,32 is adapted to engage the arm 35 of a microswitch 36 and a microswitch 37, respectively.

OPERATION

As stated hereinabove, the unit for preparing the espresso coffee has two work stations, namely station A wherein the coffee loading and disposal operations occur and station B wherein the coffee infusion operation occurs. The ground coffee is transferred from station A to station B and then, after the infusion operation has been carried out, back to station A by means of the carriage 10.

In the station A the ground coffee coming from a coffee mill (not shown) is entered in the cylindrical chamber 14 in the desired amount and then is pressed in the receptacle 13 of the carriage 10 by the coffee loading, pressing and disposal mechanism which will be described later. The ground coffee, so pressed in the receptacle 13 of the carriage 10 and designated C, ejects a coffee ground cake P remaining in this receptacle after the coffee infusion operation, through the disposal opening 15.

At this point, the motor 40 is energized which, through the reducing gear 28 and the lower end 27 of its output shaft, rotates the crank wheel 21 the pin 22 of which, by sliding in the slotted link 24 through the rotating bushing 23, causes the back movement of the carriage 10 to the coffee infusion station B. Together with the crank wheel 21 also the cam discs 31 and 32 are rotated by the upper end 29 of the output shaft of the reducing gear 28. The cam disc rotation causes the alternate actuation of the microswitches 36,37 which stop the motor 40 when the carriage 10 is in the stations A and B, respectively. In the station B, the arm 35 of the microswitch 37 will snap in the notch 34 of the cam disc 32, so that the motor 40 will be deenergized for maintaining the carriage 10 in this station.

When the coffee infusion operation has been carried out, another electric signal (supplied by conventional electric or electronic controls which the espresso coffee machine is provided with) will energize again the motor 40 which, through the reducing gear 28, will rotate again its output shaft by 180° until the arm 35 of microswitch 36 will snap in the notch 33 of the cam disc 31. In the meantime the crank wheel 21, after having rotated by 180°, will have returned the carriage 10 in the station A together with the coffee ground cake P contained in the receptacle 13.

At this point, after having disposed off the coffee ground cake P through the disposal opening 15 and loaded fresh ground coffee C, the carriage 10 is again returned in the station B and this reciprocating movement of the carriage will be repeated all the times the machine is to deliver espresso coffee.

The timing of the mechanism components occurs by adjusting the position of the cam means 30 and the consequent advance or delay in the actuation of the microswitches 36 and 37.

LOADING, PRESSING AND DISPOSAL MECHANISM

FIGS. 5 to 8 show the mechanism for loading and pressing the coffee before the coffee infusion operation as well as for disposing off the coffee grounds after the coffee infusion operation. For this purpose, a coffee pressing piston, generally designated with 50, is used. This piston slides with its upper portion in a cylindrical chamber 51 and with its lower portion in a cylindrical chamber 54 from a rest station D wherein the loading operation of the ground coffee occurs to a pressing station A wherein the pressing operation of the ground coffee occurs. Below the lower cylindrical chamber 54 in which the pressing piston 50 slides, the coffee feeding carriage 10 is arranged. This carriage 10 through its receptacle 13 receives the ground coffee coming from the coffee mill (not shown). For this purpose, the receptacle 13 of the carriage 10 is located below the cylindrical chamber 54 and the opening 15 for disposing off the coffee grounds. Provided in the lower cylindrical chamber 54 is an opening 69 for receiving the ground coffee coming from the coffee mill and/or a loading hopper 41 through which the ground coffee can be introduced.

The pressing piston 50 is connected at its upper end to a crank mechanism, generally designated 60, through a stirrup 56 (FIGS. 7 and 8) which is connected to the slotted link 64 of the crank mechanism by a nut 57 and to the piston head by a pair of nuts 58. The stirrup 56 vertically slides in a slot 59 provided in the side wall of the upper cylindrical chamber 51. Of course, between the slotted link 64 and the stirrup 56 conventional means are provided for adjusting the position of the pressing piston 50 for causing the lower surface of the pressing piston in the station A to be moved exactly to the level of the upper surface of the carriage 10 in order to introduce all the ground coffee in the carriage receptacle 53.

Figure 8:
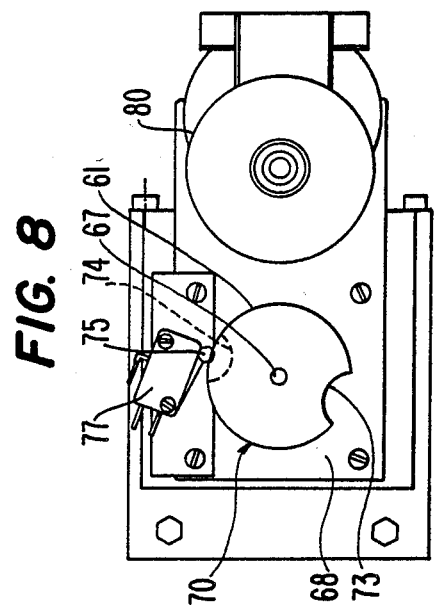
FIG. 8 is a view similar to FIG. 7 showing the coffee pressing piston in the active position in which the ground coffee pressing and disposal operation occurs.
Figure 7:
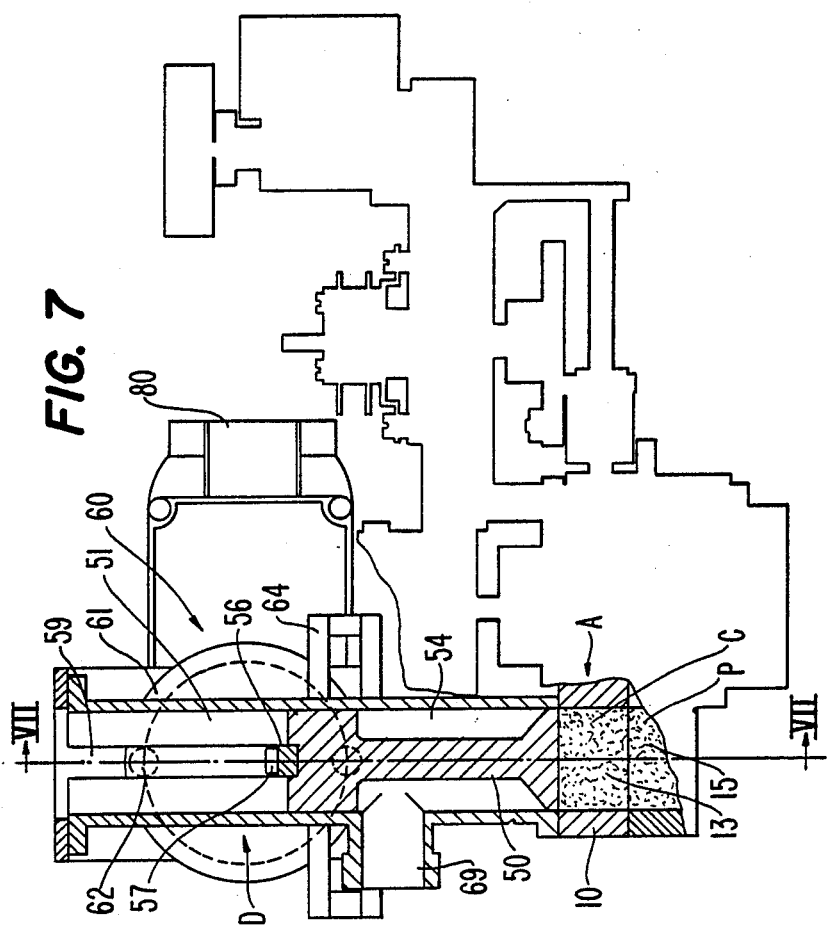
FIG. 7 is a sectional view, taken along the line VII—VII of FIG. 5, of the mechanism for loading, pressing and disposing off the coffee with the pressing piston in its rest position in which the coffee loading operation occurs.

The crank mechanism 60 comprises a crank wheel 61 having a crank pin 62 on which a bushing 63 freely rotates and the slotted link 64 provided with a guide pin 65 which slides in a bore 66 of the machine frame T (as can best seen in FIGS. 7 and 8). The bore 66, together with the pin 65 and the slot 59 in which the stirrup 56 slides, acts as a guide for the reciprocating movement of the pressing piston 50.

The crank wheel 61 is fastened to the left end (not shown in the drawing) of the output shaft of a reducing gear 68 driven by an electric motor 80, whereas to the right end 67 of the output shaft of the reducing gear 68 a cam means is fastened, generally designated 70. This cam means has two parallel cam discs 71,72 each provided with a notch 73 and 74, respectively and each of the cam discs 71,72 is adapted to engage the arm 75 and 76, respectively of a microswitch 77 and 78, respectively.

OPERATION

This mechanism also has two stations, namely a rest station D in which the ground coffee loading operation occurs and an active station A in which the coffee pressing and disposal operation occurs.

In the station D of the pressing piston 50 the ground coffee coming from the coffee mill (not shown) is entered in the cylindrical chamber 54 in the desired amount, through the opening 69 or from the suitable hopper 41. The ground coffee C falls down on the cake P of the coffee grounds in the receptacle 13 of the sliding carriage 10.

At this point, the motor 80 is energized which, through the reducing gear 68 and the left end of its output shaft, rotates the crank wheel 61 the pin 62 of which, by sliding in the slotted link 64 through the rotating bushing 63, causes the downward movement of the pressing piston 50 to the active station A, in which the pressing and disposal operations occur. Together with the crank wheel 61 also the cam discs 71 and 72 will rotate, which cams are fastened to the right end of the output shaft of the reducing gear 68. The cam disc rotation causes the alternate actuation of the microswitches 77,78 which stop the motor 80 when the pressing piston 50 is in the stations A and D, respectively. In the station A, the arm 75 of the switch 77 will snap in the notch 73 of the cam disc 71, so that the motor 80 will be deenergized for maintaining the pressing piston 50 in the pressing station A. In the station A the pressing piston 50 also causes the coffee ground cake P to be disposed off through the disposal opening 15.

When the coffee pressing operation has been carried out, another electric signal (supplied from conventional electric or electronic controls of which the espresso coffee machine is provided) will energize again the motor 80 which, through the reducing gear 68, will rotate again its output shaft by 180° until the arm 76 of the microswitch 78 will snap in the notch 74 of the cam disc 72. In the meantime the crank wheel 61 after having rotated by 180°, will have lifted the pressing piston 50 again in the station D, in which the new coffee loading operation can occur.

During the loading, pressing and disposal operations the carriage 10 will be in the advanced position wherein its receptacle 13 is aligned with both the lower cylindrical chamber 54 and the disposal opening 15 whereas during the coffee infusion operation the carriage 10 will be in its retracted position wherein its receptacle 13 is aligned with the disposal opening 15 and the pressing piston 50 will be in the lifted rest position at station D, as indicated in FIG. 7.

The timing of the mechanism components occurs by adjusting the position of the cam means 70 and the consequent advance or delay in the actuation of the microswitches 77 and 78.

After the disposal operation of the coffee grounds P, the pressing piston 50 is returned to the rest position D in which the new ground coffee loading operation occurs and this movement of the pressing piston 50 is repeated all the times the coffee machine requires an espresso coffee delivery.

From the foregoing it will be easily apparent that the device for loading, pressing, feeding, and disposing off the ground coffee according to the present invention is very simple since it is comprised of simple mechanical components which do not substantially require servicing, so that the espresso coffee machine incorporating this device is very inexpensive Furthermore with the device according to the invention, all the disadvantages of known devices of this type have been eliminated.

What is claimed is:

1. An automatic espresso coffee machine comprising:
   a frame,
   a coffee feeding carriage,
   a cylinder,
   a coffee pressing piston movable in said cylinder, and
   a device for loading, pressing, feeding, and disposing of ground coffee, said device including
   a first crank mechanism operatively connected to said coffee feeding carriage,
   a first motor operatively connected to said first crank mechanism for driving said first crank mechanism,
   a first cam means operatively connected to said first crank mechanism and said first motor for reciprocally positioning said coffee feeding carriage between a coffee loading and disposal station for conducting a coffee loading and disposal operation and a coffee infusion station for conducing a coffee infusion operation,
   a second crank mechanism operatively connected to said coffee pressing piston,
   a second motor operatively connected to said second crank mechanism for driving said second crank mechanism,
   a second cam means operatively connected to said second crank mechanism and said second motor for reciprocally moving said coffee pressing piston between a coffee pressing and disposal station for conducting a coffee pressing and disposal operation and a rest station for conducting a loading operation,
   a first control means operatively connected to said first motor for alternatingly activating and deactivating said first motor for reciprocally positioning said coffee feeding carriage between the coffee loading and disposal station and the coffee infusion station, and
   a second control means operatively connected to said second motor for alternatingly activating and deactivating said second motor for reciprocally moving said pressing piston between the coffee pressing and disposal station and the rest station.

2. An automatic espresso coffee machine according to claim 1, wherein said first crank mechanism comprises a first crank wheel and a first slotted link, said first crank wheel operatively connected to said first slotted link, said first slotted link connected to said coffee feeding carriage and slidable on a first guide means.

3. An automatic espresso coffee machine according to claim 2, wherein said first guide means comprises a pair of parallel rods.

4. An automatic espresso coffee machine according to claim 2, wherein said first slotted link comprises a first pair of parallel bars connected to each other at parallel ends by spacing elements.

5. An automatic espresso coffee machine according to claim 4, wherein said spacing elements are bushings slidable on said first guide means.

6. An automatic espresso coffee machine according to claim 1, wherein said second crank mechanism comprises a second crank wheel and a second slotted link, said second crank wheel operatively connected to said second slotted link, said second slotted link connected to said coffee pressing piston and a second guide means.

7. An automatic espresso coffee machine according to claim 6, wherein said second guide means comprises a single rod slidable through a bore in said frame.

8. An automatic espresso coffee machine according to claim 6, wherein said second slotted link comprises a second pair of parallel bars connected to each other at parallel ends by spacing elements.

9. An automatic espresso coffee machine according to claim 1, wherein said first cam means comprises a first pair of cam discs, said cam discs each having a notch offset by 180° with respect to the other.

10. An automatic espresso coffee machine according to claim 1, wherein said second cam means comprises a second pair of cam discs, said cam discs each having a notch offset by 180° with respect to the other.

11. An automatic espresso coffee machine according to claim 1, wherein said first control means comprises a first pair of microswitches operatively connected to said first motor for activating and deactivating said first motor.

12. An automatic espresso coffee machine according to claim 1, wherein said second control means comprises a second pair of microswitches operatively connected to said second motor for activating and deactivating said second motor.

* * * * *